US009745503B2

(12) United States Patent
Reyes

(10) Patent No.: US 9,745,503 B2
(45) Date of Patent: Aug. 29, 2017

(54) TREATMENT FLUIDS CONTAINING A BORON TRIFLUORIDE COMPLEX AND METHODS FOR USE THEREOF

(71) Applicant: Halliburton Energy Services, Inc., Houston, TX (US)

(72) Inventor: Enrique A. Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 14/810,808

(22) Filed: Jul. 28, 2015

(65) Prior Publication Data

US 2015/0329764 A1 Nov. 19, 2015

Related U.S. Application Data

(60) Division of application No. 13/354,461, filed on Jan. 20, 2012, now Pat. No. 9,127,194, which is a continuation-in-part of application No. 13/094,248, filed on Apr. 26, 2011, now Pat. No. 9,120,964, which is a continuation-in-part of application No.
(Continued)

(51) Int. Cl.
| | |
|---|---|
| *C09K 8/528* | (2006.01) |
| *C09K 8/68* | (2006.01) |
| *C09K 8/52* | (2006.01) |
| *E21B 37/00* | (2006.01) |
| *C09K 8/524* | (2006.01) |
| *C09K 8/78* | (2006.01) |
| *C09K 8/84* | (2006.01) |
| *C09K 8/86* | (2006.01) |
| *E21B 43/25* | (2006.01) |

(52) U.S. Cl.
CPC ............... *C09K 8/52* (2013.01); *C09K 8/524* (2013.01); *C09K 8/68* (2013.01); *C09K 8/78* (2013.01); *C09K 8/845* (2013.01); *C09K 8/86* (2013.01); *E21B 37/00* (2013.01); *E21B 43/25* (2013.01)

(58) Field of Classification Search
CPC . C09K 8/52; C09K 8/524; C09K 8/68; C09K 8/78; C09K 8/845; C09K 8/86; E21B 37/00; E21B 43/25
USPC .................................................. 507/241, 273
See application file for complete search history.

(56) References Cited

U.S. PATENT DOCUMENTS

| | | | | |
|---|---|---|---|---|
| 5,556,823 A | * | 9/1996 | Sommazi | ............... B01J 31/146 502/162 |
| 5,733,572 A | * | 3/1998 | Unger | ..................... A61K 8/14 424/1.21 |

(Continued)

OTHER PUBLICATIONS

European Office Action dated Dec. 14, 2016, which issued in European Application No. 12714031.7.

*Primary Examiner* — Aiqun Li
(74) *Attorney, Agent, or Firm* — McDermott Will & Emery LLP

(57) ABSTRACT

Treatment fluids for use in subterranean formations, particularly sandstone and other siliceous formations, may contain a source of fluoride ions to aid in mineral dissolution. In some cases, it may be desirable to generate the fluoride ions from a fluoride ion precursor, particularly a hydrofluoric acid precursor, such as a boron trifluoride complex. Methods described herein can comprise providing a treatment fluid that comprises an aqueous base fluid, a boron trifluoride complex, and a chelating agent composition, and introducing the treatment fluid into a subterranean formation.

8 Claims, 6 Drawing Sheets

Related U.S. Application Data

13/051,827, filed on Mar. 18, 2011, now Pat. No. 9,027,647, which is a continuation-in-part of application No. 11/499,447, filed on Aug. 4, 2006, now Pat. No. 8,567,504.

(56) References Cited

U.S. PATENT DOCUMENTS

| | | |
|---|---|---|
| 7,159,659 B2 | 1/2007 | Welton et al. |
| 7,299,874 B2 | 11/2007 | Welton et al. |
| 7,303,019 B2 | 12/2007 | Welton et al. |
| 9,120,964 B2 | 9/2015 | Reyes et al. |
| 9,127,194 B2 | 9/2015 | Reyes |
| 2002/0070022 A1* | 6/2002 | Chang .................. C09K 8/72 166/305.1 |
| 2003/0139298 A1* | 7/2003 | Fu ........................ C09K 8/68 507/200 |
| 2006/0183646 A1 | 8/2006 | Welton et al. |
| 2008/0108521 A1* | 5/2008 | Horton .................. C09K 8/68 507/211 |
| 2010/0276152 A1 | 11/2010 | De Wolf et al. |

* cited by examiner

TREATMENT FLUIDS CONTAINING A BORON TRIFLUORIDE COMPLEX AND METHODS FOR USE THEREOF

CROSS-REFERENCE TO RELATED APPLICATIONS

This application is a divisional of U.S. patent application Ser. No. 13/354,461, filed on Jan. 20, 2012, which is a continuation-in-part of U.S. patent application Ser. No. 13/094,248, filed on Apr. 26, 2011, which is a continuation-in-part of U.S. patent application Ser. No. 13/051,827, filed on Mar. 18, 2011, which is a continuation-in-part of U.S. patent application Ser. No. 11/499,447, filed on Aug. 4, 2006.

BACKGROUND

The present invention generally relates to treatment fluids used for stimulation and remediation operations in subterranean formations, and, more particularly, to treatment fluids that contain a boron trifluoride complex and methods for using such treatment fluids.

Treatment fluids can be used in a variety of subterranean operations. Such subterranean operations can include, without limitation, drilling operations, stimulation operations, production operations, remediation operations, sand control treatments and the like. As used herein, the terms "treat," "treatment," and "treating" refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing treatments, scale dissolution and removal, consolidation treatments, and the like. In alternative embodiments, treatment operations can refer to an operation conducted in a pipe, tubing, or like vessel in conjunction with achieving a desired function and/or for a desired purpose (e.g., scale removal).

In acidizing treatments, for example, subterranean formations comprising acid-soluble components, such as carbonate and sandstone formations, can be contacted with a treatment fluid comprising an acid to dissolve the formation matrix. After the acidizing treatment is completed, the treatment fluid and salts dissolved therein can be recovered by producing them to the surface (e.g., "flowing back" the well), leaving a desirable amount of voids or conductive pathways (e.g., wormholes in carbonates) within the formation. Acidizing operations can enhance the formation's permeability and can increase the rate at which hydrocarbons are subsequently produced from the formation.

Acidizing a siliceous formation (e.g., a sandstone formation, a clay-containing formation or a like aluminosilicate-containing formation) can introduce certain challenges that are not present when acidizing a carbonate formation. As used herein, the term "siliceous" refers to the characteristic of having silica and/or a silicate, including aluminosilicates. Most sandstone formations are composed of about 40% to about 98% sand quartz particles, i.e., silica ($SiO_2$), bonded together by varying amounts of a cementing material including carbonate (calcite or $CaCO_3$), aluminosilicates, and silicates. Carbonate formations can usually be effectively treated with a variety of acid systems, including mineral acids (e.g., hydrochloric acid) and organic acids (e.g., acetic and formic acids), often with similar success, where the acidity of the treatment fluid alone can be sufficient to solubilize formation cations. The treatment of siliceous formations with these acids, however, can have little or no effect because most organic and mineral acids do not react appreciably with the siliceous minerals characterizing these formations.

By far the most common method of treating sandstone and other siliceous formations involves introducing corrosive, very low pH fluids comprising hydrofluoric acid into the well bore and allowing the acid to react with the formation matrix. In contrast to other mineral acids, hydrofluoric acid can be very reactive with aluminosilicates and silicates (e.g., sandstone, clays and feldspars). In some cases, hydrochloric acid can be used in addition to hydrofluoric acid in the treatment fluid to maintain a low pH as hydrofluoric acid becomes spent during a treatment operation, thereby retaining certain dissolved species in a highly acidic solution. Hydrofluoric acid acidizing can often be used to remove damage that is present within the subterranean formation.

Although treatment fluids containing hydrofluoric acid and, optionally, another acid can be desirably used to affect dissolution of siliceous minerals, the use of low pH fluids can have detrimental consequences in certain instances. Specifically, at low pH values, dissolved fluoride ions can precipitate and damage the subterranean formation, particularly in the presence of certain cations such as, for example, $Al^{3+}$, Group 1 metal ions (e.g., $Na^+$ and $K^+$) and/or Group 2 metal ions (e.g., $Mg^{2+}$, $Ca^{2+}$, and $Ba^{2+}$). In some cases, this precipitation can damage the formation more than if the original treatment operation had not been performed at all. For instance, hydrofluoric acid tends to react very quickly with authigenic clays (e.g., smectite, kaolinite, illite and chlorite), especially at temperatures above 200° F. and below pH 1, as a function of mineral surface area. Because of this rapid reaction, the hydrofluoric acid can penetrate only a short distance into the formation before becoming spent. Simultaneously, precipitation of various aluminum and silicon compounds can occur as increasing amounts of siliceous minerals are dissolved at low pH. At certain temperatures and subterranean conditions, dissolution of a sandstone matrix or like siliceous material can sometimes occur so rapidly that uncontrolled precipitation can become an inevitable problem. The precipitated products can plug pore spaces and reduce the porosity and permeability of the formation, thus impairing flow potential. In addition, low pH treatment fluids containing one or more acids can present corrosion and safety issues.

The precipitation of calcium fluoride, fluorosilicates, and other insoluble fluoro compounds during hydrofluoric acid treatments can be of particular concern, since production can be delayed while damage control operations are conducted. Fluorosilicates can be especially problematic because they are the primary product of the dissolution of a clay and hydrofluoric acid. In addition, fluorosilicates can be difficult to remediate through redissolution. Calcium fluoride can be a later concern in the process, because the fluoride anion needs to be present in its free ion form, and that does not happen until a higher pH is reached after some of the acid becomes spent. Unlike fluorosilicates, calcium fluoride can be remediated, in some instances. Remediation techniques can include a commercially available treatment system from Halliburton Energy Services, Inc. known as "F-SOL" acid system, which can be used to dissolve calcium fluoride. Fluoroaluminate formation can also be of a significant concern due to the reaction of fluorosilicates with clay minerals. Fluoroaluminates are thought to be soluble as long as the pH is below about 2 and the ratio of F/Al is maintained below about 2.5. If precipitated, their dissolution typically requires strong HCl (>5%).

Avoiding the formation of calcium fluoride, fluorosilicates, or other insoluble fluoro compounds can be a primary design objective in a treatment operation conducted in a subterranean formation or elsewhere. Various means have been used with mixed success to accomplish the foregoing. Blends of organic acids and hydrofluoric acid can be used to slow the dissolution kinetics of sandstone formation solids. However, since organic acids typically have higher pKa values than do mineral acids, precipitation can become problematic as the treatment fluid's pH rises. Pre-flush sequences with mineral acids can be used to remove calcium salts from sandstone formations, before the main acidizing sequence is conducted to remove formation aluminosilicates. Generally, these flushes do not spend completely and typically return, upon flowback, with a persisting low pH. In addition to presenting safety issues, the return of an acidic fluid can result in corrosion of downhole tubular goods (including coiled tubing) and surface equipment. Other multi-stage sandstone acidizing treatment operations can also be used, particularly to remove calcium ions.

Chelating agents can also be included in treatment fluids to sequester at least a portion of the formation cations that cause unwanted precipitation. Likewise, chelating agents can be used in treating pipelines, tubing, and like vessels by removing metal ion scale from the pipeline or tubing surface. However, there are certain operational concerns that can be encountered with the use of many common chelating agents. First, many common chelating agents are not biodegradable or raise toxicity issues that can make their use in a subterranean formation problematic. Further, the available salt form of some chelating agents can actually exacerbate precipitation problems in a treatment operation rather than lessening precipitation.

Although chelating agents can extend the conditions under which treatment fluids containing hydrofluoric acid can be effectively used, even better precipitation control over a wider range of pH values, while still achieving a satisfactory dissolution rate of siliceous materials, would be highly desirable from an operational standpoint. Furthermore, in terms of safety and ease of handling, it would also be desirable to be able to affect dissolution of siliceous materials without resorting to the use of highly acidic treatment fluids.

SUMMARY OF THE INVENTION

The present invention generally relates to treatment fluids used for stimulation and remediation operations in subterranean formations, and, more particularly, to treatment fluids that contain a boron trifluoride complex and methods for using such treatment fluids.

In some embodiments, the present invention provides a method comprising: providing a treatment fluid that comprises: an aqueous base fluid; a boron trifluoride complex; and a chelating agent composition; and introducing the treatment fluid into a subterranean formation.

In some embodiments, the present invention provides a method comprising: providing a treatment fluid that comprises: an aqueous base fluid; a boron trifluoride complex; and a chelating agent composition; introducing the treatment fluid into a subterranean formation having a temperature of at least about 200° F.; allowing sufficient time to pass for at least a portion of the boron trifluoride complex to form hydrofluoric acid in the subterranean formation; and dissolving at least a portion of any insoluble silicon-containing compounds present in the subterranean formation using the treatment fluid.

In some embodiments, the present invention provides a method comprising: providing a treatment fluid that comprises: an aqueous base fluid; a boron trifluoride complex; and a chelating agent composition; and dissolving at least a portion of any insoluble silicon-containing compounds present in a subterranean formation having a temperature of at least about 200° F. by using the treatment fluid.

In some embodiments, the present invention provides a treatment fluid comprising: an aqueous base fluid; a boron trifluoride complex; and a chelating agent composition; wherein the treatment fluid has a pH of about 2 or greater.

The features and advantages of the present invention will be readily apparent to one of ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
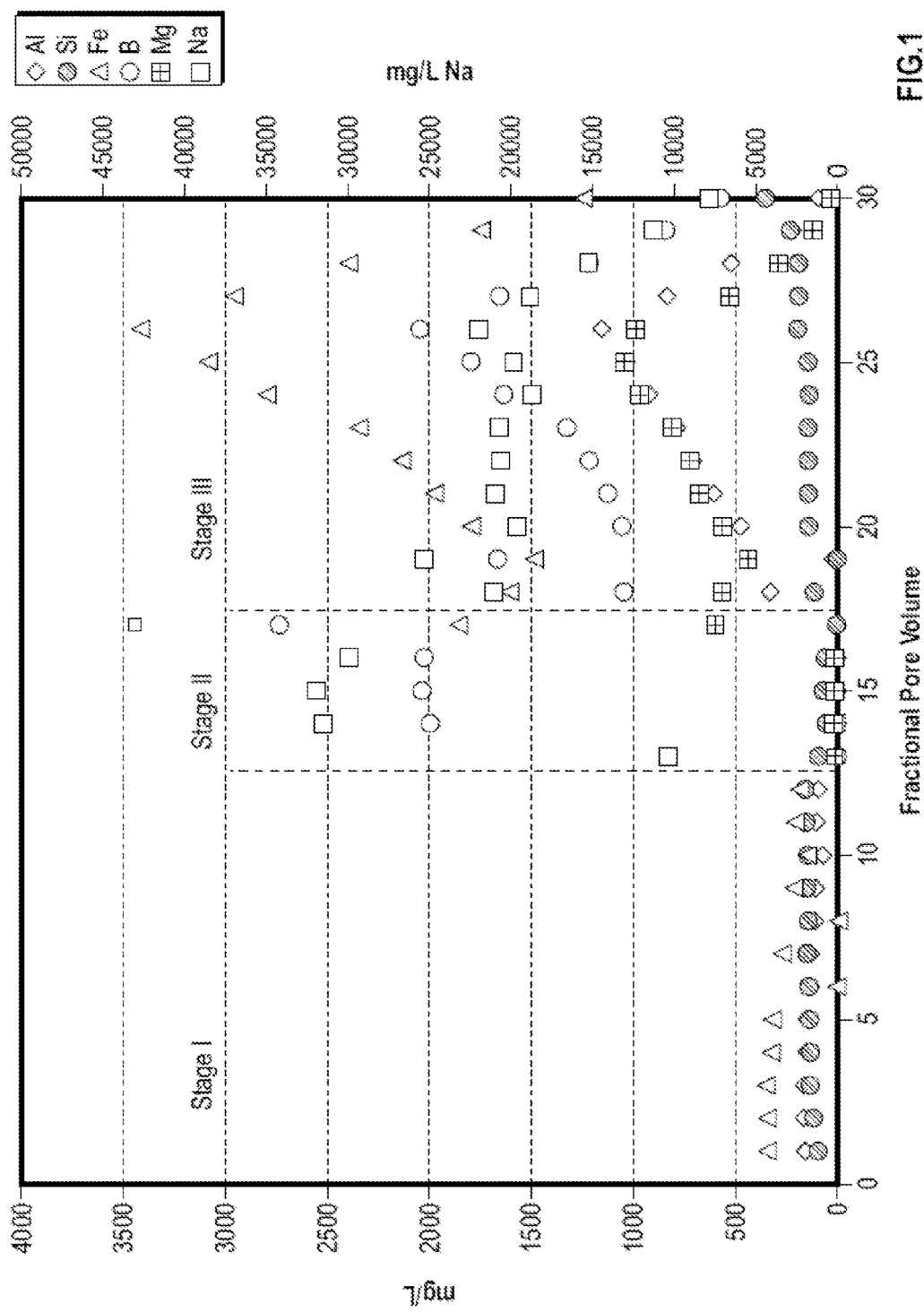
FIG. 1 shows an illustrative plot of the concentration of various ions in fractional volumes collected from a flow test of a synthetic core pack of quartz and chlorite at 245° F. using a treatment fluid containing 0.17% boron trifluoride dihydrate complex and 5% TRILON® M at pH 3.68.

The present invention generally relates to treatment fluids used for stimulation and remediation operations in subterranean formations, and, more particularly, to treatment fluids that contain a boron trifluoride complex and methods for using such treatment fluids.

Treatment fluids described herein employ a boron trifluoride complex as a precursor for the formation of hydrofluoric acid. A number of advantages may be realized by using a boron trifluoride complex as a hydrofluoric acid source in a treatment fluid instead of using other hydrofluoric acid-generating compounds (e.g., $HBF_4$, bifluoride salts, and the like) or hydrofluoric acid directly. First, the handling of highly corrosive and toxic hydrofluoric acid may be avoided, which offers numerous safety advantages when formulating and/or using the treatment fluids. Second, the use of boron trifluoride complexes allows higher pH treatment fluids (e.g., a pH of about 2 or greater) to be used, which may lessen the risk of unwanted precipitation. Finally, a number of different boron trifluoride complexes are well known, each of which may release hydrofluoric acid at a different rate depending on its stability in an aqueous fluid, which is dependent upon the ligand complexed to boron. In at least some embodiments, the differential stabilities of the boron trifluoride complexes may advantageously be utilized to affect release of hydrofluoric acid at a desired time or at a desired location within a subterranean formation.

Although boron trifluoride may be substituted for a boron trifluoride complex in any of the present embodiments, such substitution may be less preferable than using a boron trifluoride complex. The chief reason for the preferred use of a boron trifluoride complex is that boron trifluoride is a highly reactive and toxic gas. Boron trifluoride complexes, in contrast, are either liquids or solids that are much more easily handled than is ligand-less boron trifluoride. The handling of boron trifluoride complexes is well known in synthetic chemistry, and the comparatively stable nature of these compounds facilitates their use as a readily manipulated source of hydrofluoric acid. As previously noted, the boron trifluoride complex's ligand may also control the rate of hydrofluoric acid formation, which is not possible through the direct use of hydrogen fluoride gas.

The treatment fluids described herein can generally comprise an aqueous base fluid, a boron trifluoride complex, and a chelating agent composition. In some embodiments, the treatment fluid may have a pH of about 2 or greater. Keeping the treatment fluid's pH at about 2 or greater may avoid precipitation that sometimes takes place at lower pH values. Use of such a pH range may also lessen corrosion issues that may otherwise be encountered.

In some embodiments, the treatment fluids can further comprise an acid. In some embodiments, the acid can comprise a mineral acid such as, for example, hydrochloric acid. In some embodiments, the acid can comprise hydrofluoric acid. In some embodiments, the hydrofluoric acid may be produced in situ from a hydrofluoric acid-generating compound.

The generation of $HBF_3OH$ from a solution containing $H_3BO_3$ necessitates the presence of HF in order to produce a $BF_4^-$ anion. A $BF_3$ solution does not generate HF unless it undergoes a reaction that drives the formation of $BF_4^-$, an event that does not take place spontaneously. Furthermore, $BF_3$ may adsorb to a metal oxide surface when in solution and fail to undergo hydrolysis. A particular aspect of $HBF_4$ solutions is their rapid hydrolysis to generate HF and possibly other species. The hydrolysis rate of boron trifluoride complexes is not as rapid. Conventional equilibria of $HF/H_3BO_3/HCl$ solutions producing $HBF_4$ indicate that the formation of $HBF_3OH$ species is very fast.

In the embodiments described herein, a boron trifluoride complex may be used as a hydrofluoric acid-generating compound in a treatment fluid. When used in a treatment fluid, the ligand may be released into the treatment fluid and the boron trifluoride may hydrolyze to produce hydrofluoric acid, boric acid, fluoroboric acid, and possibly other species. A distinct advantage of boron trifluoride complexes in this regard is that their rate of hydrolysis is slow compared to a solution of $HBF_4$. Suitable boron trifluoride complexes for use in the present embodiments may include, for example, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, any derivative thereof, and any combination thereof.

Some of the foregoing boron trifluoride complexes may be more suitable for certain applications than for others. As will be recognized by one having ordinary skill in the art, the rate at which hydrofluoric acid is generated from the boron trifluoride complexes may be determined, at least in part, by the identity of the ligand complexed to the boron. These ligands may be released into the treatment fluid as boron trifluoride decomposes to produce hydrofluoric acid. The in situ addition of the free forms of these ligands to the treatment fluid may be advantageous in certain applications. For example, solvents (e.g., acetonitrile, alcohols and ethers), acids (e.g., phosphoric acid and acetic acid) and amines (e.g., methylamine and ethylamine) may be released into the treatment fluid from various boron trifluoride complexes, which may further enhance the effectiveness of a treatment operation in some instances.

In some embodiments, other hydrofluoric acid-generating compounds may be used in conjunction with a boron trifluoride complex. Reasons one might choose to include another hydrofluoric acid-generating compound in the treatment fluid in addition to the boron trifluoride complex is if the rate of hydrofluoric acid generation is not sufficiently high. For example, if the temperature of a subterranean formation is less than about 200° F., the rate of hydrofluoric acid generation from a boron trifluoride complex may become undesirably slow. Illustrative hydrofluoric acid-generating compounds that may be used in conjunction with boron trifluoride complexes in the present embodiments may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

In various embodiments, the boron trifluoride complex may be present in the treatment fluid in an amount ranging between about 0.1% to about 10% by weight of the treatment fluid. In other embodiments, an amount of the boron trifluoride complex may range between about 0.5% and about 10% or between about 0.5% and about 5% by weight of the treatment fluid.

The treatment fluids described herein may also use a chelating agent in concert with the boron trifluoride complex. Although their use may be optional in some embodiments, a chelating agent may help maintain dissolved cations in solution and/or sequester cations that promote precipitation of dissolved cations. For example, a chelating agent may be used to sequester aluminum cations which may otherwise form a precipitate in the presence of dissolved silicon.

A great number of chelating agents will be well known to one having ordinary skill in the art. In general, any chelating agent may be used in conjunction with the present embodiments. In some embodiments, suitable chelating agents may include compounds such as, for example, ethylenediaminetetraacetic acid (EDTA), nitrilotriacetic acid (NTA), hydroxyethylethylenediaminetriacetic acid (HEDTA), diethylenetriaminepentaacetic acid, ethylenediamindi(o-hydroxyphenylacetic) acid, glucoheptonic acid, gluconic acid, any salt thereof, any derivative thereof, and the like. The foregoing list of chelating agents is meant to be for purposes of illustration and not limitation, and other suitable chelating agents may readily be envisioned by one having ordinary skill in the art. In some embodiments, particularly advantageous chelating agents are those that are biodegradable.

As used herein, the term "biodegradable" refers to a substance that may be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. Suitable biodegradable chelating agents for use in the present embodiments may include, without limitation, glutamic acid diacetic acid (GLDA), methylglycine diacetic acid (MGDA), □β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid ("MIDA"), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, including any salt, any derivative, or any combination of these chelating agents. In some embodiments, a biodegradable chelating agent may be used in combination with a chelating agent that is not biodegradable.

In some embodiments, the chelating agents may be used in an ammonium, tetraalkylammonium, or tetraalkylphosphonium salt form, which may be particularly advantageous for treatment operations conducted using a treatment fluid containing hydrofluoric acid or a hydrofluoric acid-generating compound (e.g., a boron trifluoride complex). Use of these salt forms may avoid the additional precipitation problems that may sometimes occur when other salt forms (e.g., alkali metal salts) are used in the context of this disclosure. For example, sodium ions from a chelating agent may lead to formation of sodium fluorosilicate precipitates under certain conditions. Such precipitation issues are not believed to be problematic in the presence of ammonium, tetraalkylammonium or tetraalkylphosphonium salts.

Furthermore, treatment fluids containing a boron trifluoride complex and, optionally, a chelating agent may be used in prevention embodiments to inhibit the formation of precipitates, as discussed above, as well as remediation embodiments to remove precipitation damage in a well bore or subterranean formation. These features may beneficially allow such treatment fluids to perform single stage treatment operations including, for example, acidizing treatments (e.g., matrix acidizing), stimulation treatments, and proppant pack treatments. Likewise, beneficial effects may also be observed when treating a pipe, tubing, or like vessel, even when the pH is not particularly low.

It is to be recognized that in certain embodiments, the chelating agent composition may be omitted from the treatment fluids. In such embodiments, dissolution may take place via the hydrofluoric acid generated from the boron trifluoride complex. In addition to the boron trifluoride complex and optional chelating agent composition, salts, other pH additives, corrosion inhibitors, surface active agents, anti-sludging agents, mutual solvents, scale inhibitors, viscosifiers, gases, diverting/fluid loss agents, and the like may optionally be included in the treatment fluids. The present treatment fluids may be used in subterranean formations to prevent or remediate precipitation damage in the formation caused by the dissolution of formation cations. Likewise, the present treatment fluids may be used in treating pipes, tubing, and like vessels.

Generally, the base fluid of the treatment fluid may comprise any aqueous fluid or non-aqueous fluid. In some embodiments, the base fluid may comprise fresh water, salt water (e.g., water containing one or more salts dissolved therein), brine (e.g., saturated salt water), sea water, glycol, any combination thereof, or any derivative thereof. In other embodiments, the base fluid may comprise a liquid chelating agent or scale control agent by itself. Generally, the base fluid may be from any source, provided that it does not contain components that might adversely affect the stability and/or performance of the treatment fluid.

The chelating agent compositions of the present invention generally may comprise a chelating agent, any salt thereof, or any derivative thereof. Generally, any chelating agent may be used in the present embodiments, although in some embodiments, the chelating agent may be biodegradable. Examples of suitable derivatives of chelating agents may include esters and alkylated derivatives, for instance. Generally, any derivative may be used, provided that the derivative still maintains an affinity for binding metal cations. Examples of suitable salts of the chelating agents may include sodium salts, rubidium salts, lithium salts, potassium salts, cesium salts, and ammonium salts, including tetraalkylammonium salts and tetraalkylphosphonium salts. Mixed salt forms may also be used, if desired. As previously noted, use of the ammonium, tetraalkylammonium, or tetraalkylphosphonium salts may be particularly advantageous in certain embodiments of the present disclosure.

GLDA is a biodegradable chelating agent that is manufactured from a readily biodegradable, renewable, and human-consumable raw material, monosodium glutamate. GLDA may chelate metal ions such as, but not limited to, calcium, iron, aluminum, and magnesium over a wide pH range and is highly soluble in aqueous treatment fluids. At present, GLDA is commercially available in its sodium salt form. Other salt forms may be available non-commercially, or in smaller quantities, or may be made through an ion-exchange technique discussed below. In some embodiments herein, a preferred form of the GLDA is not the monovalent metal salt form (i.e., an alkali metal salt), but rather an ammonium, tetraalkylammonium, or tetraalkylphosphonium salt of GLDA. A suitable commercial source of GLDA is a 47 wt. % aqueous solution from Akzo-Nobel Corp. available under the tradename DISSOLVINE®.

MGDA is also commercially available in its sodium salt form. A suitable commercial source of MGDA is a 40 wt. % aqueous solution of the sodium salt form, sold by BASF under the tradename TRILON® M.

For use in embodiments in which a sodium salt of GLDA, MGDA, or any other chelating agent is available, it may be desirable, in some cases, to exchange the sodium cations for other cations such as, for example, potassium, ammonium, tetraalkylammonium, or tetraalkylphosphonium cations. As discussed above, an ammonium, tetraalkylammonium, or tetraalkylphosphonium salt may be particularly advantageous for treatment operations conducted in siliceous formations including, for example, clays and sandstones. Exchange of the sodium cations for other cations may avoid precipitation of compounds such as, for example, $NaHSiF_6$. Cation exchange is contemplated to take place under conditions that will be familiar to one having ordinary skill in the art. Methods for exchanging sodium cations for potassium, ammonium, tetraalkylammonium or tetraalkylphosphonium cations are contemplated to include, without limitation, ion exchange chromatography and selective precipitation techniques. Other means for exchanging the sodium cations may also be envisioned by one having ordinary skill in the art. As discussed further herein, it is contemplated that exchange of at least a portion of the sodium cations may produce better solubility properties, in addition to reducing the risk of unwanted precipitation during use of the present treatment fluids.

Lesser concentrations of the free acid form of the chelating agent may be produced under acidic conditions by diluting the acid in an appropriate volume of water. The amount to include will depend on the specific minerals and quantity present in the subterranean formation, and the purpose of use and desired pH of the chelating agent composition. Exemplary ranges are discussed below. In some embodiments, the pH window for clays may be about 1 to about 6 or about 2 to about 6. In other embodiments, the pH window for clays may be about 1.6 to about 4.5. In other embodiments, the pH window for clays may be about 1.5 to about 1.8, and in other embodiments about 1.6 to about 3. In some embodiments, the treatment fluid may have a pH ranging between about 1.5 and about 5, and in other embodiments, the treatment fluid may have a pH ranging between about 1.5 and about 3. In some embodiments, the treatment fluid may have a pH of about 2 or greater. In some embodiments, the treatment fluid may have a pH ranging between about 2 and about 6. At the low end of these ranges and below, the chelating agent may become ineffective for coordinating formation cations, as discussed below.

In embodiments in which a pipe, tubing, or like vessel is treated with the treatment fluids, higher pH values may be more advantageous due to the possibility of corrosion occurring at lower pH values, particularly below a pH of about 2. In some embodiments, the pH for treating a pipe, tubing, or like vessel may range between about 2 and about 6 or between about 5 and about 10. In other embodiments, the pH may range between about 5 and about 8 or between about 6 and about 8. In still other embodiments, the pH may be greater than about 8. It should be noted that at these higher pH values, the chelating agents will be significantly deprotonated and operable for chelating metal ions. For some applications such as, for example, the dissolution of barium scales, particularly in a pipe, tubing, or like vessel, high pH values such as about 8 or above or about 10 or above may be beneficial in this regard.

In addition to the intended function that the chelating agent will serve while downhole, the acid dissociation constants of the chelating agent may dictate the pH range over which the treatment fluid may be most effectively used. GLDA, for instance, has a $pK_a$ value of about 2.6 for its most acidic carboxylic acid functionality. Below a pH value of about 2.6, dissolution of formation cations will be promoted primarily by the acidity of a treatment fluid containing GLDA, rather than by chelation, since the chelating agent will be in a fully protonated state. MGDA, in contrast, has a $pK_a$ value in the range of about 1.5 to 1.6 for its most acidic carboxylic acid group, and it will not become fully protonated until the pH is lowered to below about 1.5 to 1.6. In this respect, MGDA is particularly beneficial for use in acidic treatment fluids, since it extends the acidity range by nearly a full pH unit over which the chelating agent is an active chelant. The lower pH of the treatment fluid beneficially may allow for a more vigorous acidizing operation to take place. For comparison purposes, the acid dissociation constant of EDDS (2.4) is comparable to that of GLDA.

Of the biodegradable chelating agents described herein, GLDA and MGDA are currently available from commercial sources in bulk quantities with a reliable supply stream. From a supply standpoint, these biodegradable chelating agents are therefore preferred. For the reasons noted above, these chelating agents are operable over a different range of pH values, and they are complementary to one another in this respect. In addition to their pH complementarity, the biodegradable chelating agents described herein may have the capacity for selective chelate formation with different metal ions, both as an inherent function of the chelate stability constant and a kinetic/thermodynamic formation rate as a function of pH. In this regard, other biodegradable chelating agents that are less readily available from commercial sources such as, for example, EDDS, β-ADA, IDS, and/or HIDS may be used singly or combined with GLDA or MGDA in order to "fine tune" the chelation properties of a treatment fluid. Other combinations of biodegradable or non-biodegradable chelating agents may be considered as well. Table 1 shows an illustrative listing of stability constants for various metal complexes of GLDA, MGDA, EDDS, IDS, HIDS, β-ADA and ethylenediaminetetraacetic acid (EDTA).

TABLE 1

| Chelating Agent | Cation | Log Stability Constant |
|---|---|---|
| EDTA | Fe(III) | 10.65 |
| EDTA | Ca(II) | 25.1 |
| MGDA | Fe(II) | 8.1 |
| MGDA | Fe(III) | 16.5 |
| MGDA | Ca(II) | 6.97 |
| MGDA | Mg(II) | 5.8 |
| GLDA | Ca(II) | 5.9 |
| GLDA | Fe(III) | 11.7 |
| EDDS | Fe(III) | 22.0 |
| EDDS | Ca(II) | 4.58 |
| EDDS | Mg (II) | 6.09 |
| IDS | Fe(III) | 15.2 |
| IDS | Ca(II) | 6.97 |
| IDS | Mg(II) | 4.3-5.8 |
| β-ADA | Fe(III) | 13.3-16 |
| β-ADA | Fe(II) | 8.9 |

TABLE 1-continued

| Chelating Agent | Cation | Log Stability Constant |
|---|---|---|
| β-ADA | Ca(II) | 5 |
| β-ADA | Mg (II) | 5.3 |
| HIDS | Fe(II) | 6.98 |
| HIDS | Fe(III) | 14.36 |
| HIDS | Ca(II) | 5.12 |

As shown in Table 1, EDDS, for example, may be included in a treatment fluid containing MGDA when a higher affinity for binding of Fe(III) is desired and/or a lower affinity for Ca(II) binding is needed. The combination of MGDA and EDDS has been described for illustrative purposes only, and upon knowing the stability constant of a given chelating agent for a given metal cation, one of ordinary skill in the art will be able to envision an appropriate treatment fluid containing any combination of the biodegradable chelating agents for a given application.

In addition to the stability constant, one of ordinary skill in the art will recognize that the ability of a given chelating agent to react with a given cation will be a function of the treatment fluid's pH. For instance, the maximum chelation of Fe(III) takes place at a pH of about 3 with MGDA and decreases at lower pH values. In contrast, the maximum chelation of Ca(II) and Mg(II) takes place at a higher pH with this chelating agent. Therefore, by adjusting the pH of the treatment fluid, its properties for binding a cation of interest may be altered. In the illustrative example described, a treatment fluid having a pH of about 3 or below may be used to selectively remove Fe(III) cations, while leaving Ca(II) and Mg(II) uncomplexed, thereby not wasting the chelating agent on cations whose chelation is unwanted.

In some embodiments, the chelating agent composition may comprise about 1% to about 50% by weight of the treatment fluid. In other embodiments, the chelating agent composition may comprise about 3% to about 40% by weight of the treatment fluid. In still other embodiments, the chelating agent composition may comprise between about 3% and about 20% by weight of the treatment fluid. In some or other embodiments, the ratio of the chelating agent composition to water in the treatment fluid may range between about 1% and about 50% by weight based on a known or existing concentration. In some embodiments, the ratio of the chelating agent composition to water in the treatment fluid may range between about 1% and about 20% by weight based on a known or existing concentration. In some embodiments, this ratio may range between about 3% and about 6%.

In some embodiments, the treatment fluids described herein may also include a viscoelastic surfactant. Generally, any suitable surfactant that is capable of imparting viscoelastic properties to an aqueous fluid may be used in accordance with the present embodiments. These surfactants may be cationic, anionic, nonionic, zwitterionic or amphoteric in nature, and may comprise any number of different compounds, including methyl ester sulfonates (such as those described in commonly owned U.S. Pat. Nos. 7,159,659, 7,299,874, and 7,303,019 and U.S. patent application Ser. No. 11/058,611, filed Feb. 15, 2005 and now available as United States Patent Application Publication 20060183646, each of which is incorporated by reference herein), betaines, modified betaines, sulfosuccinates, taurates, amine oxides, ethoxylated fatty amines, quaternary ammonium compounds, any derivative thereof, and any combination thereof. When present in the treatment fluids, the surfactant may generally be present in an amount sufficient to provide a desired viscosity (e.g., sufficient viscosity to divert flow, reduce fluid loss, suspend particulates, and the like) through the formation of viscosifying micelles. In particular embodiments, the surfactant may comprise between about 0.5% and about 10%, by volume, of the treatment fluid. In more particular embodiments, the surfactant may comprise between about 1% and about 5%, by volume, of the treatment fluid.

When including a surfactant, the treatment fluids may also comprise one or more co-surfactants to, among other things, facilitate the formation of and/or stabilize a foam, facilitate the formation of micelles (e.g., viscosifying micelles), increase salt tolerability, and/or stabilize the treatment fluid. The co-surfactant may comprise any surfactant suitable for use in subterranean environments and that does not adversely affect the treatment fluid. Examples of co-surfactants suitable for use in the present treatment fluids may include, for example, linear $C_{10}$-$C_{14}$ alkyl benzene sulfonates, branched $C_{10}$-$C_{14}$ alkyl benzene sulfonates, tallow alkyl sulfonates, coconut alkyl glyceryl ether sulfonates, sulfated condensation products of mixed $C_{10}$-$C_{18}$ tallow alcohols with about 1 to about 14 moles of ethylene oxide, and mixtures of higher fatty acids containing about 10 to about 18 carbon atoms. In particular embodiments, the co-surfactant may be present in an amount ranging between about 0.05% and about 5% by volume of the treatment fluid. In more particular embodiments, the co-surfactant may be present in an amount ranging between about 0.25% and about 0.5% by volume of the treatment fluid. The type and amount of co-surfactant suitable for a particular application may depend upon a variety of factors, such as the type of surfactant present in the treatment fluid, the composition of the treatment fluid, the temperature of the treatment fluid, and the like. A person of ordinary skill in the art, with the benefit of this disclosure, will recognize when to include a co-surfactant in a particular application, as well as the appropriate type and amount of co-surfactant to include.

The present treatment fluids may also optionally comprise one or more salts to modify the rheological properties (e.g., viscosity) of the treatment fluids. These salts may be organic or inorganic. Examples of suitable organic salts (or free acid forms of organic salts) may include, but are not limited to, aromatic sulfonates and carboxylates (e.g., p-toluenesulfonate and napthalenesulfonate), hydroxynaphthalene carboxylates, salicylates, phthalates, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts may include water-soluble potassium, sodium, and ammonium salts (e.g., potassium chloride and ammonium chloride). Any combination of the salts listed above also may be included in the treatment fluids described herein. Where included, the one or more salts may be present in an amount ranging between about 0.1% and about 75% by weight of the treatment fluid. In more particular embodiments, the one or more salts may be present in an amount ranging between about 0.1% and about 10% by weight of the treatment fluid. A person of ordinary skill in the art, with the benefit of this disclosure, will recognize when to include a salt in a particular application, as well as the appropriate type and amount of salt to include.

The present treatment fluids may also include one or more well-known additives such as, for example, gel stabilizers, fluid loss control additives, particulates, acids, corrosion inhibitors, catalysts, clay stabilizers, biocides, friction reducers, additional surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. One of ordinary skill in the art, with the benefit of this disclosure, will be able to determine the appropriate type and amount of such additives for a particular application. For example, in some embodiments, it may be desired to foam a treatment fluid using a gas such as, for example, air, nitrogen, or carbon dioxide.

In some embodiments, methods described herein can comprise providing a treatment fluid that comprises an aqueous base fluid, a boron trifluoride complex, and a chelating agent composition; and introducing the treatment fluid into a subterranean formation.

In some embodiments, methods described herein can comprise providing a treatment fluid that comprises an aqueous base fluid, a boron trifluoride complex, and a chelating agent composition; introducing the treatment fluid into a subterranean formation having a temperature of at least about 200° F.; allowing sufficient time to pass for at least a portion of the boron trifluoride complex to form hydrofluoric acid in the subterranean formation; and dissolving at least a portion of any insoluble silicon-containing compounds present in the subterranean formation using the treatment fluid.

In some embodiments, methods described herein can comprise providing a treatment fluid that comprises an aqueous base fluid, a boron trifluoride complex, and a chelating agent composition; and dissolving at least a portion of any insoluble silicon-containing compounds present in a subterranean formation having a temperature of at least about 200° F. by using the treatment fluid.

In some embodiments, the subterranean formation into which the present treatment fluids are introduced may have a temperature of at least about 200° F. As previously noted, the degradation rate of boron trifluoride complexes above this temperature may provide a desirably rapid rate of hydrofluoric acid formation. As also previously described, other hydrofluoric acid-generating compounds may be included in the treatment fluids if the rate of hydrofluoric acid generation is insufficient. For example, other hydrofluoric acid-generating compounds may be included in the treatment fluid if the formation temperature is too low to support a desired rate of hydrofluoric acid formation (e.g., at a formation temperature of less than about 200° F.). However, it is to be recognized that other hydrofluoric acid-generating compounds may also be included, if desired, even when higher temperature subterranean formations are being treated.

In some embodiments, the present treatment fluids may be used as a pre-treatment to a fracturing treatment, especially in subterranean formations that contain different layers of sedimentary rock. In such embodiments, the treatment fluid may be placed in a subterranean formation via a well bore before a fracturing treatment. The subsequent fracturing treatment may be a traditional fracturing treatment or an additional acidizing treatment directed at treating a particulate pack (e.g., proppant pack) introduced during the fracturing treatment. In such embodiments, the use of the treatment fluid described herein may be considered a prevention mechanism to prevent the formation of potentially problematic precipitates.

In some embodiments, a treatment fluid described herein may be used to clean the well bore area before bringing the well into final production. Using such a treatment fluid may remove damage, blockages, debris, and natural clays in the formation, for example. In at least some embodiments, this method may be considered a remediation method of the present invention. For example, in some embodiments, the treatment fluid may remediate precipitation damage that is present in the subterranean formation.

In some embodiments, the treatment fluids described herein may be useful in subterranean formations that comprise siliceous materials such as, for example, naturally occurring sandstone, quartz, propping material, and the like. A siliceous material may be naturally present in the formation (e.g., the sandstone) or deliberately introduced (e.g., a quartz proppant). Due to the geochemical processes operative in the formation, such as high temperature, high pressure, and abrupt changes to the geochemical balance after the introduction of treatment fluids of different ionic strength, the siliceous material may undergo rapid changes that lead to reduction of permeability or hydraulic conductivity. When the treatment is carried out in the matrix of the sandstone, the effect is believed to remove aluminosilicates from the conductive pathways. In a particulate pack or a propped fracture, the effects may be compounded because, under certain scenarios, geochemical scaling may occur. Another reason is due to fines migration, which is the displacement of particles from the rock matrix into the pack and their subsequent deposition. Furthermore, the presence of aluminum in a sandstone or in ceramic proppants made of alumina may exacerbate the problem due to their intrinsic reactivity in low pH media or under abrupt changes to the chemical potential of a fluid leading to dissolution of the material. This signifies that varying amounts of silicon and/or aluminum are placed into solution, may migrate and re-precipitate or crystallize and form new minerals that obstruct the flow of fluids.

In some embodiments, it may be desirable to include a salt or a salt substitute in the treatment fluid. The beneficial effects of adding a salt or salt substitute are surprising, since it is conventionally believed that adding a salt to a treatment fluid may exacerbate precipitation problems. A preferred example of a suitable salt is ammonium chloride or like ammonium salt. It is believed that this is a problem specific to treatment fluids containing hydrofluoric acid or a hydrofluoric acid-generating compound, since alkali metal salts such as sodium and potassium salts may promote the formation of precipitates in the presence of fluoride ions. In contrast, adding an ammonium salt may not exacerbate the precipitation problem.

In some embodiments, the treatment fluids described herein may be used to treat a proppant pack, particularly where the proppant pack's hydraulic conductivity has been impacted. In some embodiments, treatment fluids described herein may be used to perform a stimulation operation in a subterranean formation, for example, an acidizing operation. In some embodiments, the treatment fluids may be used in a fracturing operation by introducing the treatment fluid into the subterranean formation at a pressure sufficient to create or enhance at least one fracture therein. In other embodiments, the treatment fluid may be introduced into a formation that has been previously fractured.

To facilitate a better understanding of the present invention, the following examples of preferred embodiments are given. In no way should the following examples be read to limit, or to define, the scope of the invention.

EXAMPLES

Core flow tests were conducted using synthetic mixtures of quartz and clay. The actual synthetic mixture composition used is given for each experiment. The quartz employed was a mixture of 20/40 and 100 mesh in a ratio of 20:80 to 40:60, where the ratio was adjusted to control the final permeability of the synthetic core pack. The clays were obtained from the Clay Minerals Society Repository. The synthetic core mixture was equilibrated with a brine before use (typically 1 M NaCl, KCl, or NH$_4$Cl, but also lower concentrations were used if the clay did not show swelling characteristics). A 1-ft long, 2 in. diameter, rubber Viton sleeve was employed to accommodate the synthetic core pack. A confining pressure of 2000 psi and a back pressure of 500 psi-1000 psi were applied. Flow rates of 1 to 5 mL/min were typically employed. Samples were collected at regular intervals and analyzed via inductively coupled plasma spectroscopy (ICP-OES) at the equilibrium pH. A shut-in period of one hour or more was used in each test to increase contact time of the core pack with the treatment fluid and to increase the concentration of dissolved ions. After the shut-in period, a brine flush of the core pack was performed. Temperature was controlled via a Eurotherm controller.

Nuclear magnetic resonance spectroscopic analyses were carried out using a Bruker 500 MHz spectrometer. Chemical shifts were externally referenced to 0.1 M boric acid (δ=0 ppm) and are uncorrected. To avoid possible contamination from borosilicate glass, a polytetrafluoroethylene NMR tube insert was used.

Example 1

The synthetic pack employed was a quartz and chlorite (CCa-1, Ripidolite, Flagstaff Hill, Calif.) mixture in a 95:5 ratio that was equilibrated for 16-24 hours in 2% NaCl brine and maintained at 245° F. The treatment fluid contained 5% TRILON® M (sodium salt of methylglycine diacetic acid, available from BASF) and 0.17% boron trifluoride dihydrate complex at pH 3.68. A preflush treatment fluid of 15% v/v TRILON® M at pH 4 was also used (see below). Any necessary pH adjustments were made with 36% HCl or a sufficient quantity of TRILON® M stock solution (pH 11). Several pore volumes of a like treatment fluid lacking the boron trifluoride complex were flowed through the core pack before introducing the treatment fluid containing the boron trifluoride complex.

FIG. 1 shows an illustrative plot of the concentration of various ions in fractional volumes collected from a flow test of a synthetic core pack of quartz and chlorite at 245° F. using a treatment fluid containing 0.17% boron trifluoride dihydrate complex and 5% TRILON® M at pH 3.68. As shown in FIG. 1, the ionic composition of the effluent indicated that aluminum was progressively eluted from the porous matrix, closely followed by magnesium and iron. The latter ion's concentration was the largest due to its presence in chlorite. The concentration of boron also reflected that of the latter cations. The sodium concentration was nearly constant as the equilibration brine was NaCl, and the treatment fluid included the sodium salt of methylglycine diacetic acid. The amount of dissolved silicon did not exceed 500 mg/L. The test incorporated a shut-in period of 6-12 hours after introduction of the boron trifluoride complex-containing treatment fluid. Prior to the shut-in period, the concentration of boron, from boron trifluoride dihydrate, remained relatively constant at approximately 2000 mg/L. After the shut-in period, the boron concentration decreased to nearly half of its starting value and progressively increased as the post-flush brine (NH$_4$Cl or NaCl or KCl) began to transport the dissolved matter.

Example 2

This example was performed similarly to Example 1, except the synthetic core pack was a 10% kaolinite/90% quartz mixture equilibrated at 240° F., and the treatment fluid contained 5% Trilon® M and 0.4% boron trifluoride dihydrate complex at a pH of 3.8.

Figure 2:
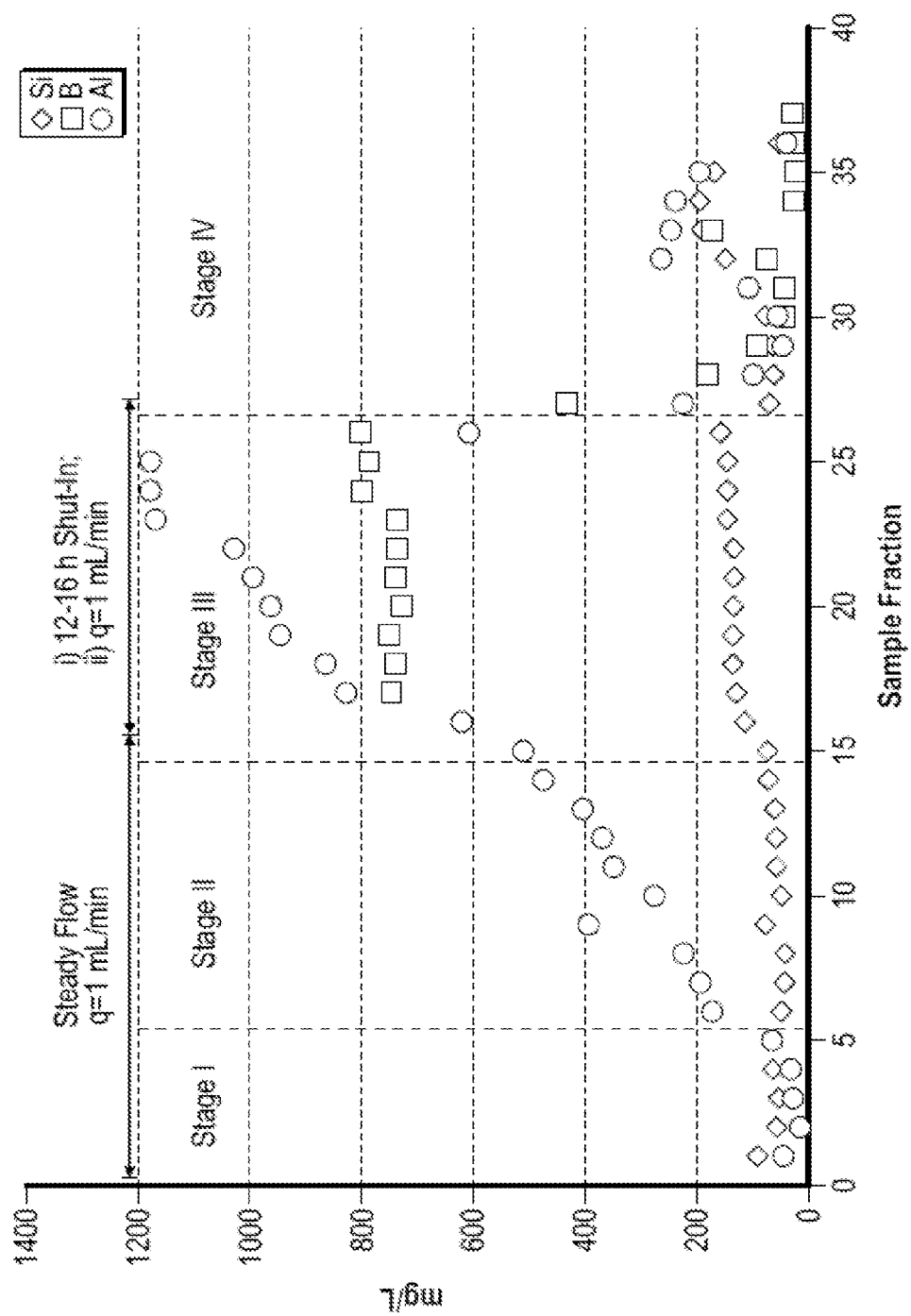
FIG. 2 shows an illustrative plot of the concentration of silicon, aluminum, and boron in fractional volumes collected from a flow test of a synthetic core pack containing 10% Kaolinite and 90% quartz (55% SSA-1 and 45% 20/40 Brady Sand) at 240° F. using a treatment fluid containing 0.4% boron trifluoride dihydrate complex and 5% TRILON® M at pH 3.8.

FIG. 2 shows an illustrative plot of the concentration of silicon, aluminum, and boron in fractional volumes collected from a flow test of a synthetic core pack containing 10% Kaolinite and 90% quartz (55% SSA-1 and 45% 20/40 Brady Sand) at 240° F. using a treatment fluid containing 0.4% boron trifluoride dihydrate complex and 5% TRILON® M at pH 3.8. The first 10 fractions after equilibration (stage II) were collected at a flow rate of 1 mL/min. Thereafter, a 12-16 hour shut-in period was mimicked by stopping flow. Following the shut-in period, the remaining samples were collected at a flow rate of 1 mL/min.

The ionic profile of the effluent displayed a progressive appearance of aluminum as the packed column was brought back to flowing conditions following the shut-in period (stage III). Stage I was performed with a treatment fluid lacking the boron trifluoride complex. The treatment fluid used in stage II included both the chelating agent and the boron trifluoride complex, which was injected at constant rate during five pore volumes. During stage I, the concentration of Al and Si in the effluent was below 100 ppm for both analytes. The effluent in stage II showed an increase in the Al concentration from 100 ppm to 500 ppm, while the Si concentration remained nearly invariant below 100 ppm. After the shut-in period, the compositional analyses indicated a progressive increase of both Al and Si levels (stage III). The treatment fluid in this last stage was displaced or over-flushed with a standard brine, and no additional treatment fluid was introduced to the packed column after the shut-in period. A peak Al concentration of 1170 ppm was measured. The amount of dissolved Si peaked at 148 ppm and remained constant around 125 ppm. Stage IV utilized additional brine to determine if boron was released over time and as the treatment fluid's pH changed. During stage III, the boron concentration ranged between approximately 700 ppm and 800 ppm. Continued brine flow in stage IV decreased the boron concentration to less than 50 ppm.

Example 3

This example was performed with a synthetic core pack of 15% kaolinite/85% quartz mixture equilibrated at 245° F. The treatment fluid contained 15% Triton® M and 0.4% boron trifluoride dihydrate complex at a pH of 3.45. A treatment fluid containing 20% v/v TRILON® M at pH 2 and lacking a boron trifluoride complex was first flushed through the core pack (3 pore volumes), followed by a 1 hour shut-in period. After the shut-in period, the packed column was flushed with 0.2 M NaCl, returning the pH of the effluent to 6.6. Thereafter, the treatment fluid containing the boron trifluoride complex (150 mL) was introduced, followed by a shut-in period of 180 minutes. Following the second shut-in period, the core pack was eluted with 0.2 M NaCl solution.

Figure 3:
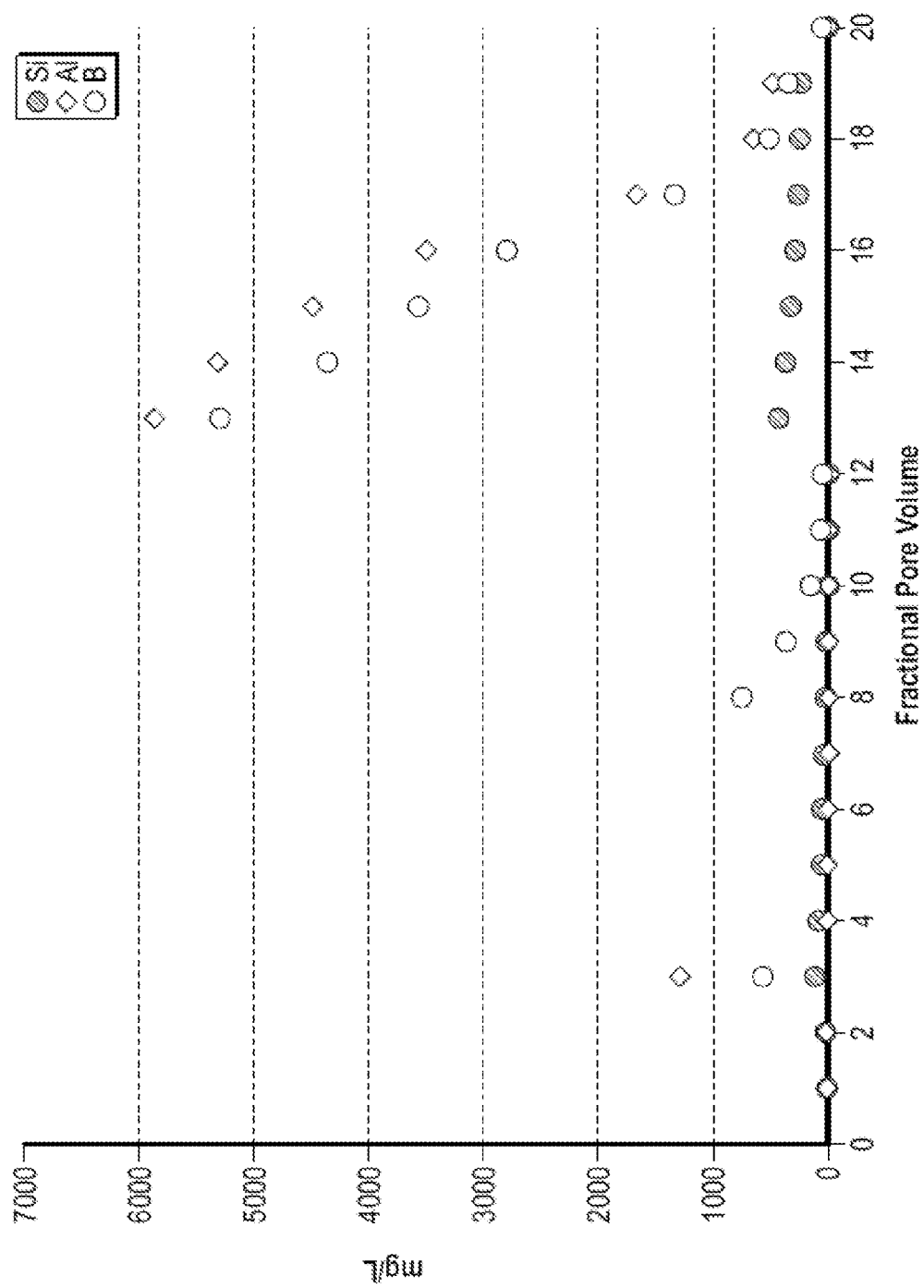
FIG. 3 shows an illustrative plot of the concentration of silicon, aluminum, and boron in fractional volumes collected from a flow test of a synthetic core pack containing 15% Kaolinite and 85% quartz (55% SSA-1 and 45% 20/40 Brady Sand) at 245° F. using a treatment fluid containing 0.4% boron trifluoride dihydrate complex and 15% TRILON® M at pH 3.45.

FIG. 3 shows an illustrative plot of the concentration of silicon, aluminum, and boron in fractional volumes collected from a flow test of a synthetic core pack containing 15% Kaolinite and 85% quartz (55% SSA-1 and 45% 20/40 Brady Sand) at 245° F. using a treatment fluid containing 0.4% boron trifluoride dihydrate complex and 15% TRILON® M at pH 3.45. Analyses for effluent collected before the addition of the boron trifluoride complex-containing treatment fluid are not presented in FIG. 3, since no leaching of mineral phase was observed (Al and Si concentrations <200 ppm). As shown in FIG. 3, after the second shut-in period, the concentrations of Al and B in the effluent increased rapidly as they were transported by the NaCl brine. The silicon concentrations, in contrast, remained nearly invariant below 500 ppm.

Example 4

$^{11}$B NMR Spectra of Boron Trifluoride Dihydrate

Figure 4:
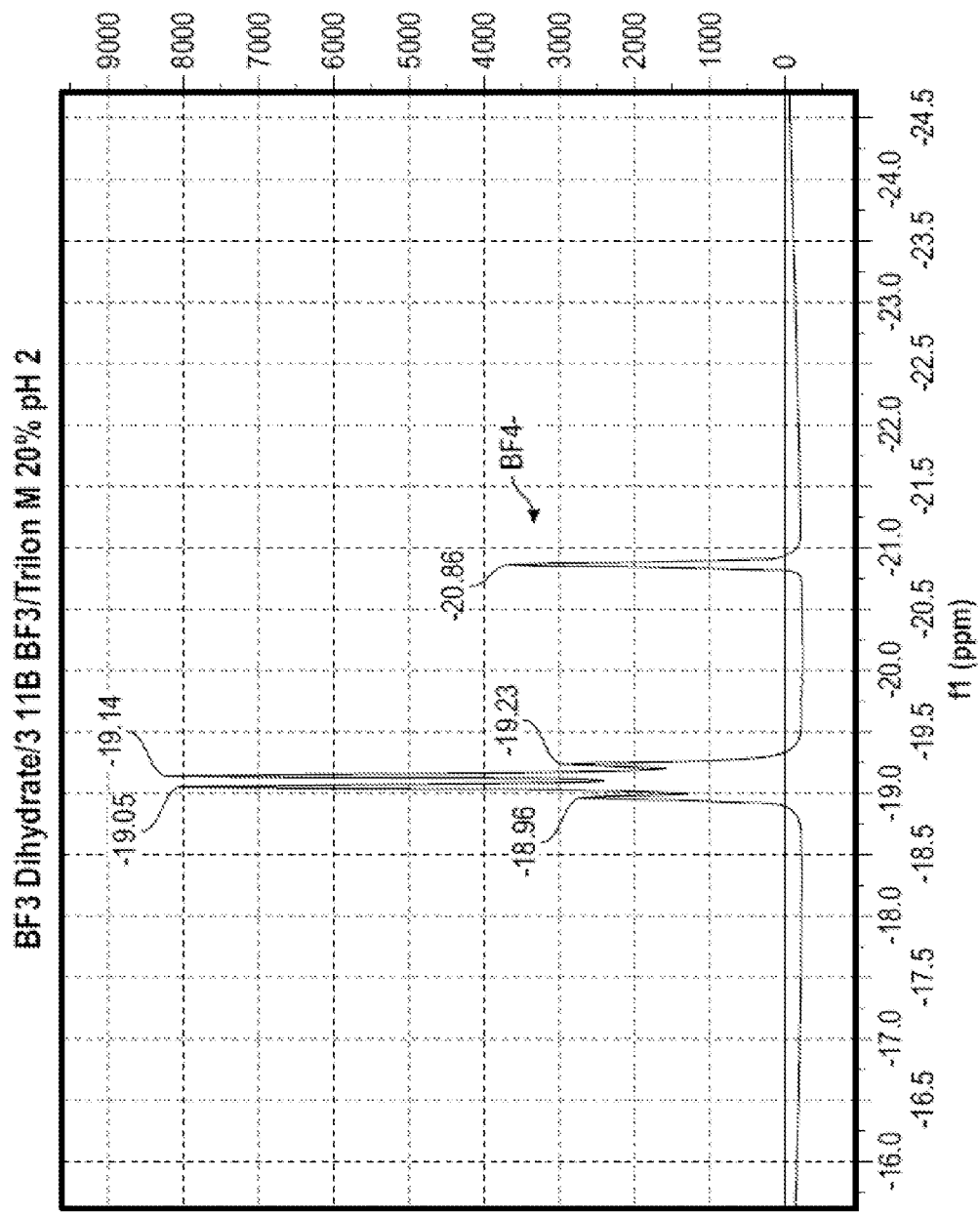
FIG. 4 shows an illustrative $^{11}$B NMR spectrum of boron trifluoride dihydrate complex at pH 2 in a solution containing TRILON® M.
Figure 5:
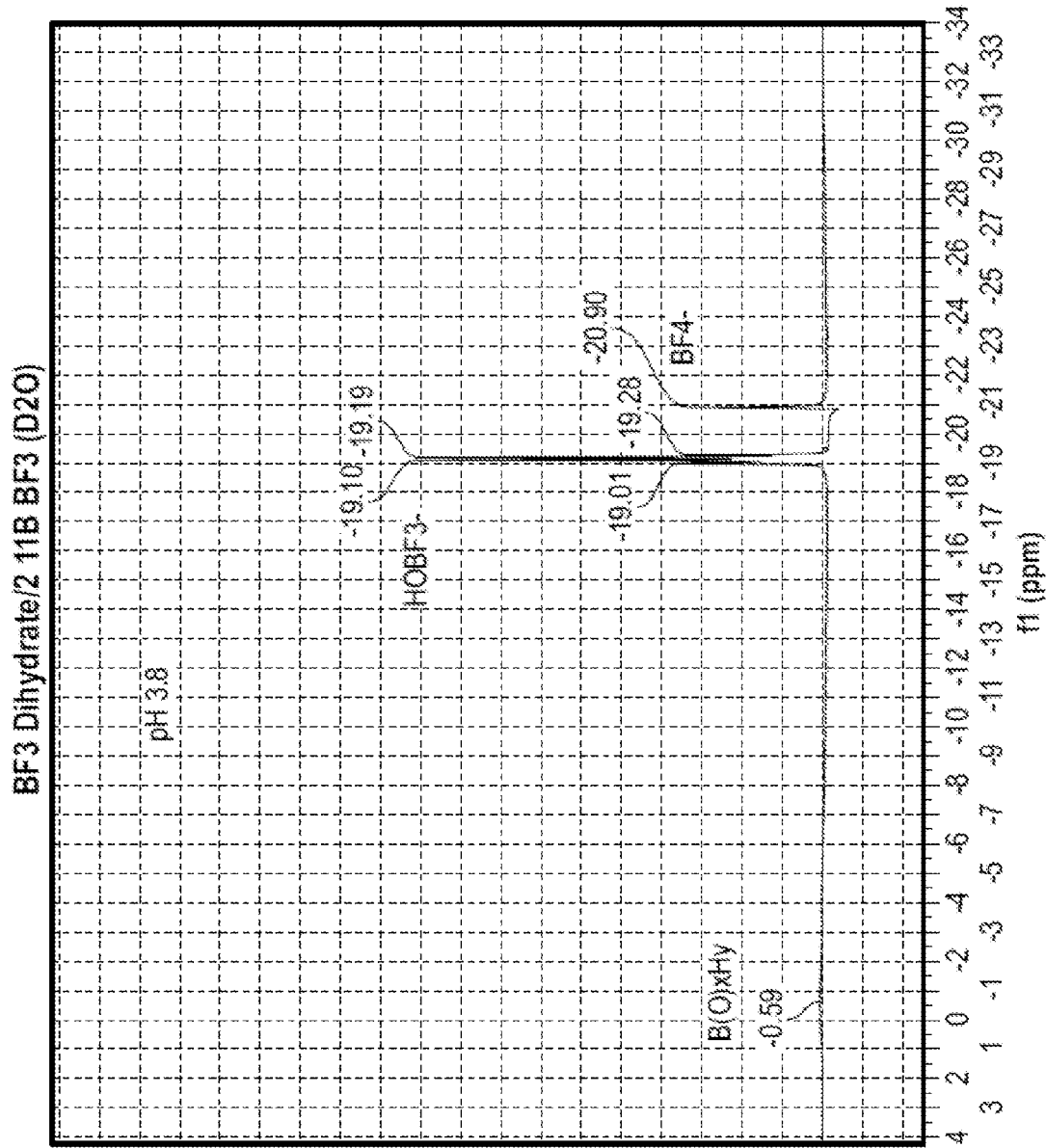
FIG. 5 shows an illustrative $^{11}$B NMR spectrum of boron trifluoride dihydrate complex at pH 3.8 in a solution containing TRILON® M.
Figure 6:
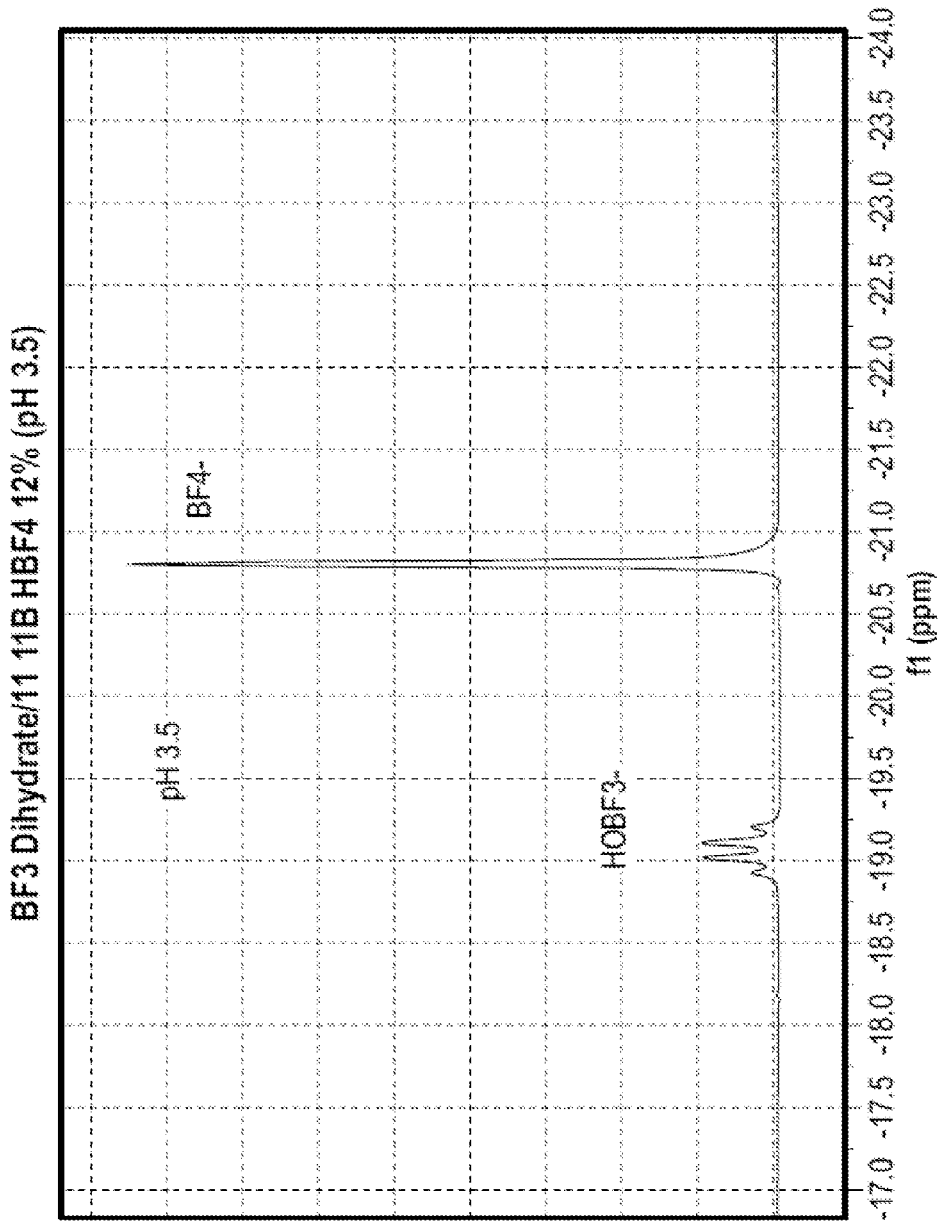
FIG. 6 shows a comparative $^{11}$B NMR spectrum of a 12.5 wt. % fluoroboric acid solution at pH 5.

FIG. 4 shows an illustrative $^{11}$B NMR spectrum of boron trifluoride dihydrate complex at pH 2 in a solution containing TRILON® M. FIG. 5 shows an illustrative $^{11}$B NMR spectrum of boron trifluoride dihydrate complex at pH 3.8 in a solution containing TRILON® M. Based on the $^{11}$B NMR spectra, it appeared that the boron trifluoride complex was converted to predominantly fluoroborate anion (singlet, δ=−20.7 ppm) and hydroxyborate anion (quartet, d=−19 ppm). As shown in FIG. 5, a minor amount of a third boron-containing species was also formed. Based on the chemical shift, it is believed that this third species may be boric acid or another borate species with a high degree of mobility and exchange. The presence of boric acid implies that boron trifluoride can dissociate under the treatment conditions to generate HF, $HF_2^-$ or other active hydrogen fluoride species that can promote aluminosilicate mineral dissolution. FIG. 6 shows a comparative $^{11}$B NMR spectrum of a 12.5 wt. % fluoroboric acid solution at pH 5, which shows fluoroborate anion to be the predominate species present.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A treatment fluid comprising:
   an aqueous base fluid;
   a boron trifluoride complex comprising at least one complex selected from the group consisting of boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, and any combination thereof; and
   a chelating agent composition;
   wherein the treatment fluid has a pH of about 2 or greater.

2. The treatment fluid of claim 1, wherein the chelating agent composition comprises at least one biodegradable chelating agent selected from the group consisting of glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids,
   N-bis[2-(1,2-dicarboxyethoxy)ethyl]glycine,
   N-bis[2-(1,2-dicarboxyethoxy)ethyl]aspartic acid,
   N-bis[2-(1,2-dicarboxyethoxy)ethyl]methylglycine,
   N-tris[(1,2-dicarboxyethoxy)ethyl]amine, N-methyliminodiacetic acid, iminodiacetic acid, N-(2-acetamido) iminodiacetic acid, hydroxymethyl-iminodiacetic acid,
   2-(2-carboxyethylamino) succinic acid, 2-(2-carboxymethylamino) succinic acid, diethylenetriamine-N,N"-disuccinic acid, triethylenetetramine-N,N"'-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid,
   1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis (oxyethylenenitrilo)-N,N'-disuccinic acid, glucoheptanoic acid, cysteic acid-N,N -diacetic acid, cysteic acid-N-monoacetic acid,
   alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, and any combination thereof.

3. The treatment fluid of claim 1, wherein the chelating agent composition is substantially free of alkali metals and comprises an ammonium, tetraalkylammonium, or tetraalkylphosphonium salt of the at least one chelating agent.

4. The treatment fluid of claim 1, wherein the treatment fluid has a pH ranging between about 5 and about 10.

5. The treatment fluid of claim 1, wherein the treatment fluid has a pH ranging between about 2 and about 6.

6. The treatment fluid of claim 1, wherein the boron trifluoride complex has a concentration ranging between about 0.5% and about 5% by weight in the treatment fluid.

7. The treatment fluid of claim 1, further comprising:
- a hydrofluoric acid-generating compound selected from the group consisting of fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

8. The treatment fluid of claim 1, wherein the boron trifluoride complex has a neutral charge.

\* \* \* \* \*